June 14, 1927.                J. T. JOHNSON                1,632,138
                              PICTURE FRAME
                           Filed April 2, 1926
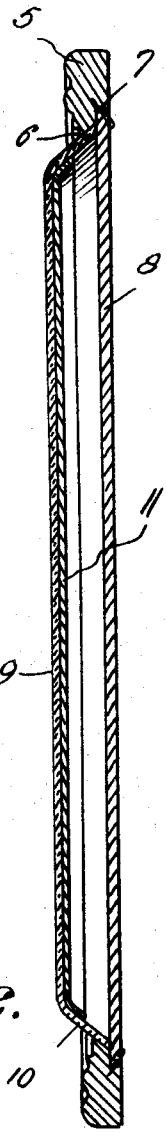
Fig. 1.
Fig. 2.
Inventor
J. T. Johnson,
By Clarence A. O'Brien
Attorney Patented June 14, 1927.

1,632,138

UNITED STATES PATENT OFFICE.

JAMES T. JOHNSON, OF BIRMINGHAM, ALABAMA.

PICTURE FRAME.

Application filed April 2, 1926. Serial No. 99,285.

This invention relates to picture frames, and more particularly to the glass therefor, the primary object of the invention being to provide a particularly shaped glass to the back side of which the picture to be displayed is attached in order that the picture will be extended outwardly of the frame to give a relief effect, and to overcome the flat like effect that is now produced by mounting pictures in the usual frames provided for this purpose.

Previous attempts have been made to mount a picture in order that the same will be extended forwardly of the frame, but such attempts have not been satisfactory mainly for the reason that the glass used as a part of the frame are of concavo convex formation, and that when a picture is disposed upon the back side of this form of glass the picture is invariably stretched so that it will conform to the curvature of the glass resulting in the distortion of the picture, even though the same is brought outwardly of the frame.

Accordingly, it is an additional object of the invention to provide a glass for picture frames that will have the desired effect of bringing the picture forwardly of the frame but at the same time permit of the displaying of the picture in an absolutely undistorted manner.

Other objects will become apparent as the nature of the invention is better understood, the same comprising the novel form of frame hereinafter more fully described, shown in the accompanying drawing and claimed.

In the drawing:

Figure 1 is a front elevation of a picture frame constructed in accordance with this invention within which is mounted a picture, and Figure 2 is a greatly enlarged detail vertical section therethrough.

Now having particular reference to the drawing, 5 indicates a frame preferably of oval shape and of any suitable material, the inner edge thereof being beveled or inclined as at 6 while the back side of the frame surrounding the beveled edge is rabbeted as at 7 for permitting a backing 8 to be mounted flush with the frame, said backing being secured to the frame in any manner desirable.

For association with the frame 5 is a glass 9 also of oval shape and of lesser diameter than the diameter in the opening in the frame 5. This glass is plane upon opposite sides and is formed at its edge with an inclined skirt or flange 10 the inner edge of which is of a diameter similar to the diameter of the beveled or inclined opening 6 of the frame 5 in order that the window will be supported within the opening of the frame in a manner as clearly disclosed in Figure 2, in which position the glass will be disposed forwardly of the frame. The picture 11 which must also be of oval shape is arranged in face to face contact with the back side of the glass and secured thereto in any manner desirable, the edge of the picture being preferably bent outwardly for arrangement upon the skirt or flange portion 10 of the glass. If desired, the exposed portion of the skirt or flange may be painted to cover the edge of the picture thus acting as a mat, or it may be unpainted and the picture framed with the aid of mats or without mats, if the same are not desired.

It will thus be seen that by provision of a frame of this character the picture will be extended forwardly of the frame but at the same time will be mounted in a flat like condition in order that the picture will not be distorted by applying the same to an oval or other curved surface.

Having thus described the invention, what I claim as new and desire to secure by Letters Patent is:—

In a mount for pictures, a frame, a glass for arrangement in front of the frame and having a plane rear face upon which the picture is to be disposed, a rearwardly extending flange formed upon the edge of the glass and extending into the frame for maintaining the glass and picture forwardly of the frame, said frame being provided with a groove in the rear surface thereof about its opening, and a plane backing seated in the groove to maintain the glass within the frame, said backing being flush with the rear surface of the frame.

In testimony whereof I affix my signature.

JAMES T. JOHNSON.